(12) United States Patent
Kim (10) Patent No.: US 9,121,720 B2
(45) Date of Patent: Sep. 1, 2015

(54) SYSTEM AND METHOD FOR PROVIDING DRIVING INFORMATION OF ELECTRIC VEHICLE

(71) Applicant: Hyundai Motor Company, Seoul (KR)

(72) Inventor: Heung Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/133,436

(22) Filed: Dec. 18, 2013

(65) Prior Publication Data

US 2015/0019115 A1    Jan. 15, 2015

(30) Foreign Application Priority Data

Jul. 11, 2013 (KR) .......................... 10-2013-0081603

(51) Int. Cl.
*G06F 19/00* (2011.01)
*G01C 21/34* (2006.01)

(52) U.S. Cl.
CPC .................................. *G01C 21/3469* (2013.01)

(58) Field of Classification Search
None
See application file for complete search history.

(56) References Cited

U.S. PATENT DOCUMENTS

| | | | |
|---|---|---|---|
| 7,590,483 B2 | 9/2009 | Tsuge et al. | |
| 7,650,235 B2 * | 1/2010 | Lee et al. | 701/428 |
| 8,706,416 B2 * | 4/2014 | Wang et al. | 701/533 |
| 8,768,553 B2 * | 7/2014 | Cho et al. | 701/22 |
| 8,825,354 B2 * | 9/2014 | Horita | 701/118 |
| 2005/0065711 A1 * | 3/2005 | Dahlgren et al. | 701/117 |
| 2005/0131607 A1 * | 6/2005 | Breed | 701/45 |
| 2006/0122750 A1 * | 6/2006 | Choi et al. | 701/36 |
| 2006/0184322 A1 * | 8/2006 | Kim | 701/211 |
| 2009/0306834 A1 * | 12/2009 | Hjelm et al. | 701/1 |
| 2009/0312896 A1 * | 12/2009 | Fernandez | 701/22 |
| 2011/0166739 A1 * | 7/2011 | Oesterling | 701/30 |
| 2012/0086395 A1 * | 4/2012 | Kim et al. | 320/109 |
| 2012/0226421 A1 * | 9/2012 | Kote et al. | 701/51 |
| 2013/0018574 A1 * | 1/2013 | Adler | 701/408 |
| 2013/0024060 A1 * | 1/2013 | Sukkarie et al. | 701/22 |
| 2013/0046510 A1 * | 2/2013 | Bowne et al. | 702/187 |
| 2013/0193753 A1 * | 8/2013 | Brey | 307/10.7 |
| 2014/0266789 A1 * | 9/2014 | Matus | 340/870.07 |
| 2014/0358358 A1 * | 12/2014 | Jones et al. | 701/31.4 |

FOREIGN PATENT DOCUMENTS

| | | |
|---|---|---|
| KR | 10-2011-0040220 A | 4/2011 |
| KR | 10-2012-0076011 A | 7/2012 |
| KR | 10-2013-0063371 A | 6/2013 |

* cited by examiner

*Primary Examiner* — Calvin Cheung
(74) *Attorney, Agent, or Firm* — McDermott Will & Emery LLP (57) ABSTRACT

A system for providing driving information of an electric includes a telematics terminal configured to collect driver information, internal state information, and external environment information, and transmitting the collected driver information, internal state information, and external environment information. A path information server is configured to transmit road information and traffic information to the outside. A telematics server is configured to accumulate information received from the telematics terminal and the path information server, calculate a driving pattern of a first driver based on the accumulated information, calculate one or more candidate paths based on the driving pattern, and transmit the calculated one or more candidate paths to the telematics terminal.

10 Claims, 5 Drawing Sheets

SYSTEM AND METHOD FOR PROVIDING DRIVING INFORMATION OF ELECTRIC VEHICLE

CROSS-REFERENCE TO RELATED APPLICATION

This application claims the benefit of priority to Korean Patent Application No. 10-2013-0081603 filed in the Korean Intellectual Property Office on Jul. 11, 2013, the entire contents of which are incorporated herein by reference.

TECHNICAL FIELD

The present disclosure relates to a system and a method of providing driving information of an electric vehicle, and more particularly, to a system and a method of providing driving information of an electric vehicle, which provide an optimum path based on a driving pattern of a driver.

BACKGROUND

Telematics is a term used in which telecommunication is combined with informatics and is defined as next generation information providing services for a vehicle by combining an information technology (IT) industry in which wireless communication, a vehicle terminal, contents, and the like are organically related with each other and an automotive industry.

The telematics services may provide traffic and driving information, emergency situation response information, remote vehicle diagnosis services, and Internet by utilizing a wireless communication technology and a global positioning system (GPS) technology.

Driving information services in the related art provide a shortest time path and a shortest distance path by using traffic information based on a position of a vehicle and a destination. A currently developed electric vehicle provide a short drivable distance by a single battery charging, compared to a vehicle using a fossil fuel, so that the electric vehicle needs to drive a path in which battery consumption is minimized.

However, the driving information services in the related art provide the same path to all of the vehicles regardless of a driving habit of a driver, so that there is a limitation in providing an optimum path, which may minimize the battery consumption, to an individual driver. Further, if driving habits of multiple drivers are established into a database, and the database calculates a driving path, a more accurate and realistic drivable distance of an electric vehicle may not be predicted.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a system and a method of providing driving information of an electric vehicle, which provide an optimum path with a minimum drivable distance decrement of an electric vehicle based on a driving pattern of a driver.

According to an exemplary embodiment of the present disclosure, a system for providing driving information of an electric vehicle includes a telematics terminal configured to collect driver information, internal state information, and external environment information, and transmitting the collected driver information, internal state information, and external environment information to the outside. A path information server is configured to transmit road information and traffic information to the outside. A telematics server is configured to accumulate information received from the telematics terminal and the path information server, calculate a driving pattern of a first driver based on the accumulated information, calculate one or more candidate paths based on the driving pattern, and transmit the calculated one or more candidate paths to the telematics terminal.

The driver information may include driver personal information, vehicle model information, driving distance information, and driving time information.

The internal state information may include vehicle speed information, acceleration/deceleration information, battery information, motor load information, and maintenance history information. The external environment information may include position and weather information.

In a case where a destination is transmitted from the telematics terminal, the telematics server may search for the driving pattern of the first driver and information matched with the driving pattern based on the information accumulated in a database and may calculate a drivable distance decrement based on the driving pattern of the first driver and information about second driver.

The telematics server may calculate an optimum path in which the drivable distance decrement is minimal among the one or more candidate paths.

When it is determined that driving to the destination is impossible in a current battery charging state based on the information received from the telematics terminal, the searched driving pattern of first driver, and the information matched with the driving pattern, the telematics server may calculate a path having minimum battery consumption and an electricity charging station.

The telematics server may transmit a shortest time path, a shortest distance path, and the optimum path to the telematics terminal, and the telematics terminal may display a desired path selected among the shortest time path, the shortest distance path, and the optimum path, and guide the drivable distance decrement of the desired path.

The telematics terminal may include an information collector configured to collect the driver information, the internal state information, and the external environment information. A terminal communicator is configured to transmit the collected information and a destination to the telematics server through wireless communication and to receive the one or more candidate paths and a drivable distance decrement. A display is configured to display a selected desired path and a drivable distance decrement expected in a case where the first driver drives the desired path. A terminal controller is configured to transmit the collected information and control the information collector, the terminal communicator, and the display so as to display the desired path.

The telematics server may include a server communicator configured to receive the driver information, the internal state information, and the external environment information and to transmit driving related information to the outside. A database is configured to store the received information. A driving pattern calculator is configured to calculate the driving pattern of the first driver based on the information accumulated in the database. A drivable distance calculator is configured to calculate a drivable distance decrement based on the calculated driving pattern and information about second driver accumulated in the database. A path calculator is configured to calculate a shortest time path, a shortest distance path, and an optimum path in which the drivable distance decrement is minimal.

According to another exemplary embodiment of the present disclosure, a method of providing driving information of an electric vehicle includes receiving a destination from a telematics terminal. A driving pattern of a first driver stored in a database is searched, and driver information, internal state information, and external environment information matched with the driving pattern stored in the database are searched. A drivable distance decrement is calculated based on the searched driving pattern, and one or more candidate paths are calculated including an optimum path in which the calculated drivable distance decrement is minimal. The calculated one or more candidate paths are transmitted to the telematics terminal.

The driving pattern may be calculated based on the driver information, the internal state information, and the external environment information accumulated in the database.

The calculating of the one or more candidate paths including the optimum path in which the calculated drivable distance decrement is minimal may include calculating a shortest time path in which a time to arrive a destination is minimal. A shortest distance path is calculated in which a driving distance to the destination is minimal. A path having minimum battery consumption to the destination and an electricity charging station is calculated.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Figure 1:
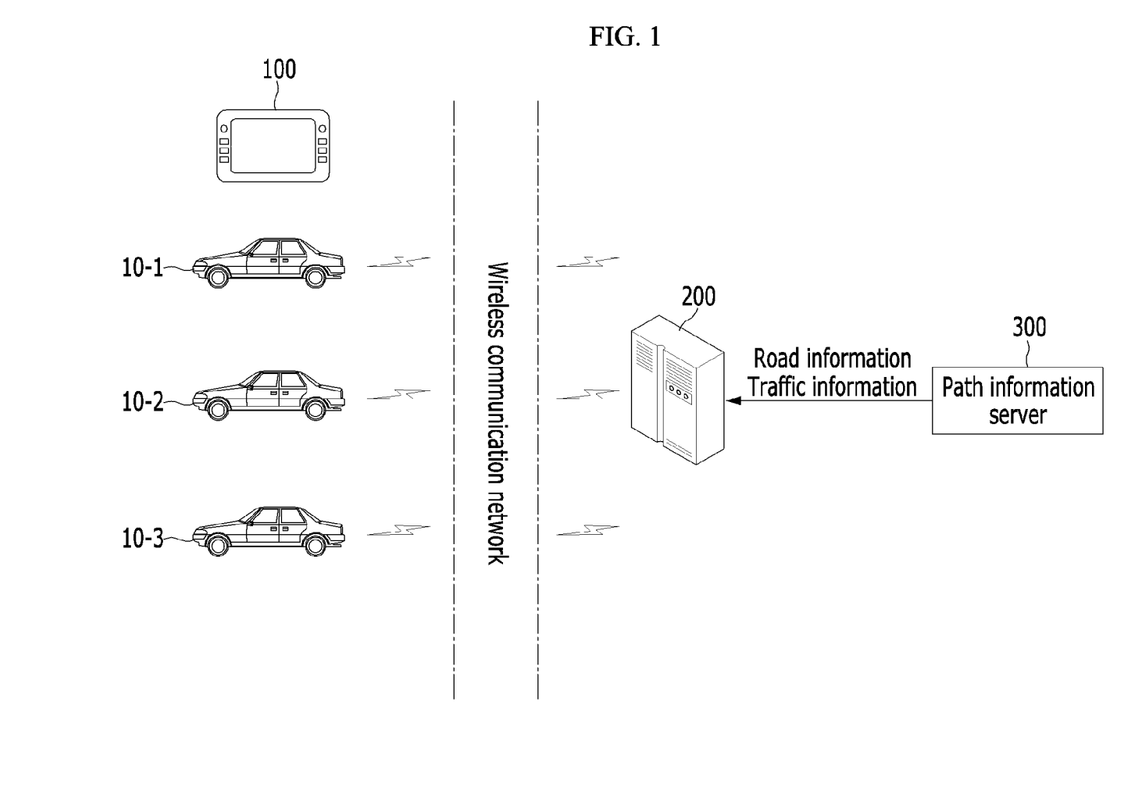
FIG. 1 is a network diagram schematically illustrating a configuration of a system for providing driving information of an electric vehicle according to an exemplary embodiment of the present disclosure.

FIG. 1 is a network diagram schematically illustrating a configuration of a system for providing driving information of an electric vehicle according to an exemplary embodiment of the present disclosure.

Referring to FIG. 1, a system for providing driving information of an electric vehicle according to an exemplary embodiment of the present disclosure includes a telematics terminal 100, a telematics server 200, and a path information server 300.

For convenience of description, it is assumed that each of a plurality of electric vehicles 10-1 to 10-3 includes a telematics terminal 100 below.

The telematics terminal 100 collects driver information, internal state information, and external environment information and transmits the collected information to a telematics server 200 through a wireless communication network.

The driver information may include driver personal information, vehicle model information, driving distance information, and driving time information. The driver personal information may include information for customer authentication. The vehicle model information may include information about a type and a manufacturing date of an electric vehicle. The driving distance information may include information about a driving distance of the electric vehicle after starting and a driving distance of the electric vehicle based on a duration (for example, daily, weekly, or monthly). The driving time information may include information about a driving distance of the electric vehicle after starting and a driving time of the electric vehicle based on the duration (for example, daily, weekly, or monthly).

The internal state information may include vehicle speed information, acceleration/deceleration information, battery information, motor load information, and maintenance history information. The battery information may include information about a type of battery and a battery charging state. The maintenance history information may include information about an error code and a maintenance state of the electric vehicle.

The external environment information may include position information and weather information. The position information may include information about a current position of the electric vehicle. The weather information may include information about a temperature, snow, rain, a wind direction, and a wind speed.

The telematics server 200 accumulates information received from the telematics terminal 100, and calculates a driving pattern of a first driver based on the accumulated information. The telematics server 200 calculates at least one candidate path based on the calculated driving pattern and transmits the calculated candidate path to the telematics terminal 100.

The telematics server 200 may interwork with the path information server 300 to receive road information and traffic information through a wired/wireless communication network in order to calculate the driving pattern and the candidate path.

The road information may include node information, link information, road gradient information, and road curvature information. The traffic information may include information about a traffic blocking situation due to the quantity of traffic, a traffic accident, and the like in a city or suburban road and an expressway.

Here, a "node" means a network factor corresponding to a crossroad area in an actual road. A "link" is a network factor representing a connection section on the actual road, which is a connection part between nodes and means a network connecting section including a start node and a termination node.

The telematics terminal 100 and the telematics server 200 according to an exemplary embodiment of the present disclosure will be described in more detail with reference to FIGS. 2 and 3.

Figure 2:
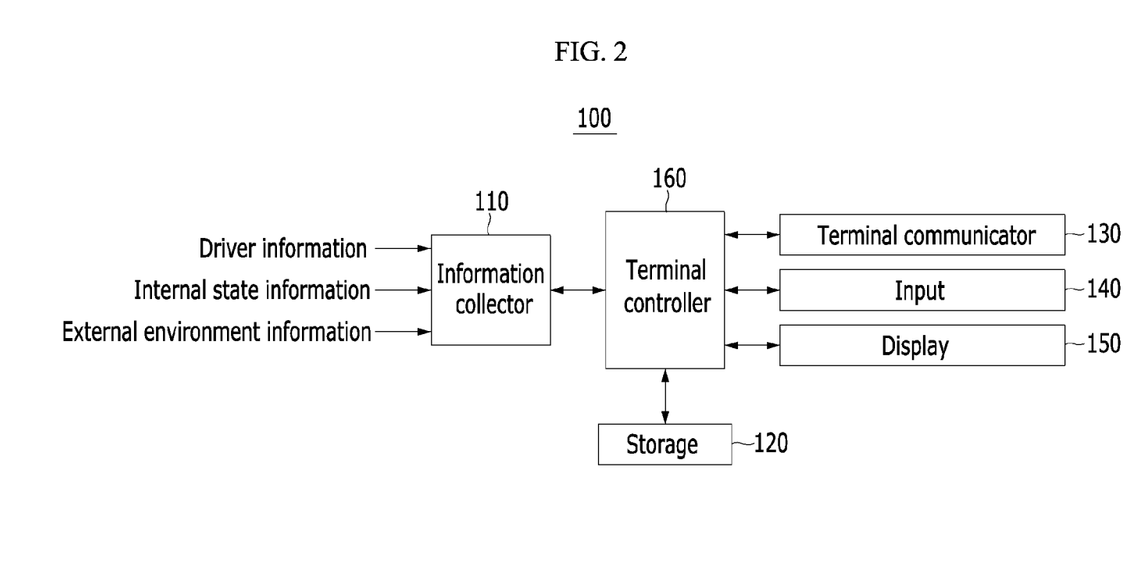
FIG. 2 is a block diagram schematically illustrating a telematics terminal according to an exemplary embodiment of the present disclosure.

FIG. 2 is a block diagram schematically illustrating the telematics terminal according to an exemplary embodiment of the present disclosure.

Referring to FIG. 2, the telematics terminal 100 according to an exemplary embodiment of the present disclosure includes an information collector 110, a terminal communicator 130, an input 140, a display 150, and a terminal controller 160. Further, the telematics terminal 100 may further include a storage 120 for storing information collected by the information collector 110.

The information collector 110 may be disposed outside the vehicle or provided as one of internal vehicle components to collect vehicle information. The vehicle information includes driver information, internal state information, and external environment information.

The collected information may be manageable and obtainable through various sensors and a navigation system included inside the vehicle in real time during driving.

Particularly, the information obtained through the various sensors and the navigation system included inside the vehicle is transferred through a communication control system within the vehicle. A high speed controller area network (CAN) communication may be used as the communication control system within the vehicle.

The collected information may be transferred to the storage 120, stored, and classified in the storage 120.

The information collected by the information collector 110 is transferred to the terminal controller 160. Further, necessary information among the information stored in the storage 120 may be extracted and transferred to the terminal controller 160.

The terminal communicator 130 transmits the collected information and a destination to the telematics server 200 through a wireless communication network. Further, the terminal communicator 130 receives at least one candidate path calculated by the telematics server 200 and a drivable distance decrement corresponding to at least one calculated candidate path.

When a destination is input by a first driver, the input 140 transfers the input destination to the terminal controller 160. The display 150 displays a desired path selected from the first driver according to a control of the terminal controller 160 and a drivable distance decrement corresponding to the selected desired path. That is, the display 150 may display the desired path on an electronic map and display the drivable distance decrement expected in a case where the first driver drives the desired path.

The terminal controller 160 may be implemented with one or more microprocessors operated by a predetermined program, and the predetermined program may include a series of commands for performing each step included in a method of providing driving information of an electric vehicle according to an exemplary embodiment of the present disclosure to be described below. The terminal controller 160 controls a general operation of the telematics terminal 100.

Figure 3:
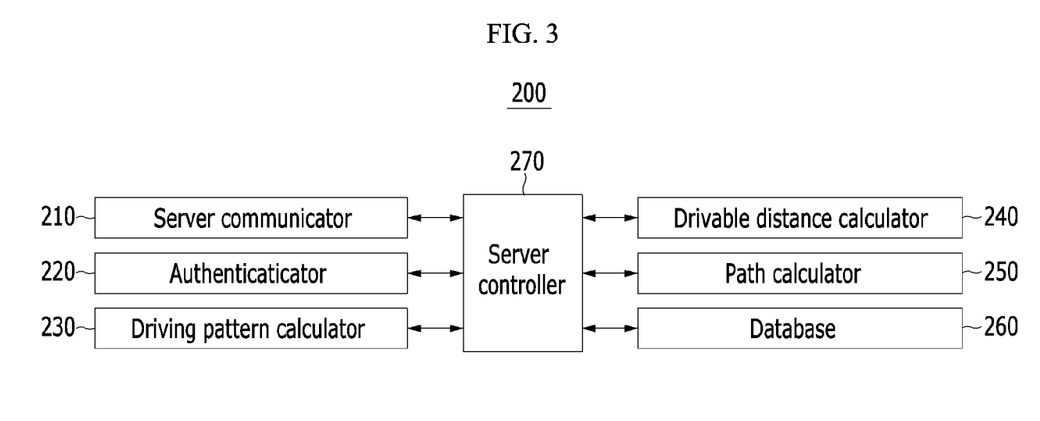
FIG. 3 is a block diagram schematically illustrating a telematics server according to an exemplary embodiment of the present disclosure.

FIG. 3 is a block diagram schematically illustrating the telematics server according to an exemplary embodiment of the present disclosure.

Referring to FIG. 3, the telematics server 200 according to an exemplary embodiment of the present disclosure includes a server communicator 210, an authenticator 220, a driving pattern calculator 230, a drivable distance calculator 240, a path calculator 250, a database 260, and a server controller 270.

The server communicator 210 receives driver information, internal state information, and external environment information from the telematics terminal 100, and receives road information and traffic information from the path information server 300. The received information is stored and classified in the database 260. That is, as the number of information received from the telematics terminal 100 is increased, the number of information accumulated in the database 260 is increased.

Further, the server communicator 210 transmits driving related information to the telematics terminal 100. The driving related information includes at least one calculated candidate path and a drivable distance decrement corresponding to at least one calculated candidate path.

The authenticator 220 operates a driver authentication in response to an authentication request of the telematics terminal 100 and performs an authentication procedure based on pre-registered driver authentication information and received driver personal information.

The driving pattern calculator 230 calculates a driving pattern of a first driver based on the information accumulated in the database 260. The driving pattern of the first driver is calculated through a statistical analysis utilizing the driving distance information, the driving time information, the vehicle speed information, and the acceleration/deceleration information accumulated in the database 260. The calculated driving pattern of the first driver is stored in the database 260.

The drivable distance calculator 240 may calculate a drivable distance in a current battery charging state based on the calculated driving pattern. That is, the drivable distance calculator 240 may calculate an average drivable distance for each battery charging state based on the information accumulated in the database 260. For example, the driving distance information according to a decrease in a charging quantity of a battery based on the driving pattern of the first driver may be accumulated in the database 260, and the drivable distance calculator 240 may calculate an average drivable distance for each battery charging state.

In a case where the path calculator 250 calculates one or more candidate paths, the drivable distance calculator 240 may correct the average drivable distance based on the road information and the traffic information and calculate a drivable distance decrement based on the path. For example, the drivable distance calculator 240 may calculate the quantity of battery consumption for each link based on the driving pattern of the first driver and calculate the drivable distance decrement for each path based on the calculated quantity of battery consumption.

Further, the drivable distance calculator 240 may search for information matched with the driving pattern of the first driver in the database 260. That is, the drivable distance calculator 240 may calculate the drivable distance decrement based on searched information on second driver.

The path calculator 250 receives a current position and a destination of the electric vehicle and calculates one or more drivable candidate paths from the current position to the destination. The path calculator 250 may calculate a plurality of candidate paths through a shortest distance algorithm and a shortest time algorithm from the current position to the destination.

The path calculator 250 may calculate an optimum path in which the drivable distance decrement for each path is minimal among the calculated candidate paths. Further, the path calculator 250 compares the candidate path with the drivable distance calculated by the drivable distance calculator 240, and when driving to the destination in the current battery charging state is impossible, the path calculator 250 may calculate a path having minimum battery consumption and an electricity charging station.

The driver information, the internal state information, and the external environment information received from the telematics terminal 100 are stored in the database 260. Further, the calculated driving pattern of the first driver is stored.

The server controller 270 may be implemented with one or more microprocessors operated by a predetermined program, and the predetermined program may include a series of commands for performing each step included in the method of providing the driving information of the electric vehicle according to an exemplary embodiment of the present disclosure to be described below. The server controller 270 controls a general operation of the telematics server 200.

Although FIG. 3 illustrates the authenticator 220, the driving pattern calculator 230, the drivable distance calculator 240, and the path calculator 250 connected with the server controller 270, the authenticator 220, the driving pattern calculator 230, the drivable distance calculator 240, and the path calculator 250 may be further modulated by the server controller 270 to be provided.

Figure 4:
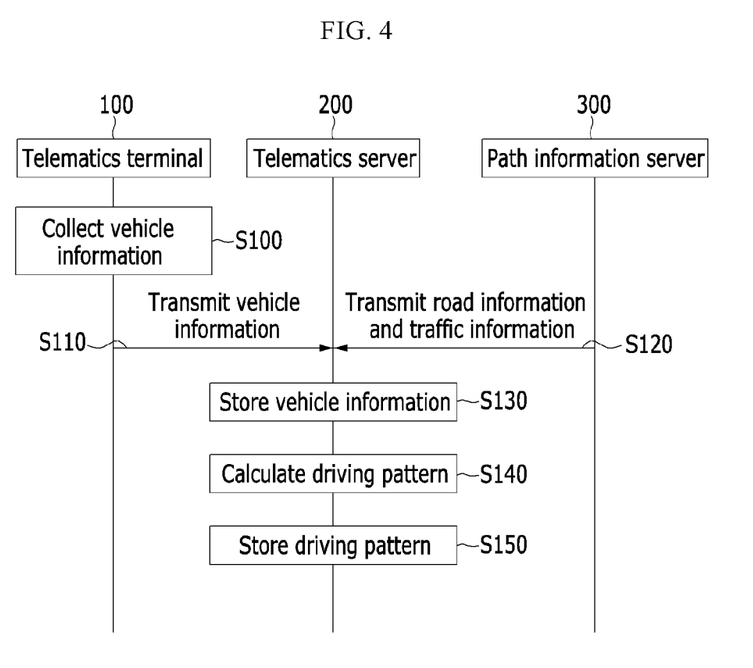
FIG. 4 is a flowchart illustrating a method of calculating and storing a driving pattern of a driver according to an exemplary embodiment of the present disclosure.

FIG. 4 is a flowchart illustrating a method of calculating and storing a driving pattern of a driver according to an exemplary embodiment of the present disclosure.

Referring to FIG. 4, the telematics terminal 100 collects vehicle information (S100). The vehicle information includes driver information, internal state information, and external environment information.

The telematics terminal 100 transmits the vehicle information to the telematics server (S110). The path information server 300 transmits road information and traffic information to the telematics server (S120). The road information may include node information, link information, road gradient information, and road curvature information. The traffic information may include information about a traffic blocking situation due to a traffic condition, the number of traffic accident, and the like in a city or suburban road, and an expressway.

The telematics server 200 stores vehicle information in the database 260 (S130). The telematics server 200 calculates a driving pattern of a first driver based on the vehicle information, the road information, and the traffic information accumulated in the database 260 (S140). The calculated driving pattern is stored in the database 260 (S150).

Figure 5:
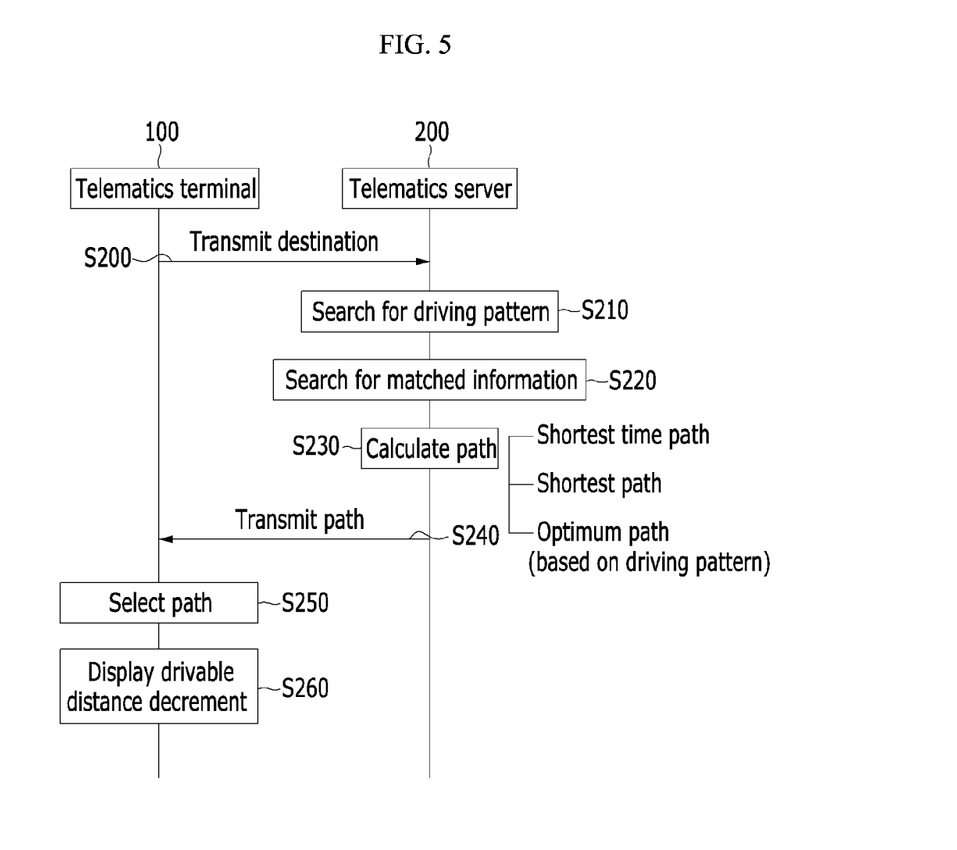
FIG. 5 is a flowchart illustrating a method of providing driving information of an electric vehicle according to an exemplary embodiment of the present disclosure.

FIG. 5 is a flowchart illustrating a method of providing driving information of an electric vehicle according to an exemplary embodiment of the present disclosure.

Referring to FIG. 5, when a destination is input by a driver, the telematics terminal 100 transmits the destination to the telematics server 200 (S200).

The telematics server 200 searches for the driving pattern of the first driver stored in the database 260 (S210). Further, the telematics server 200 searches for information matched with the driving pattern stored in the database 260 (S220). That is, the telematics server may utilize information about second driver when calculating a path.

The telematics server 200 calculates at least one candidate path including a shortest time path, a shortest distance path, and an optimum path (S230). The optimum path, which is a path calculated based on the driving pattern of the first driver, has a minimum drivable distance decrement. When it is determined that driving to the destination is possible with a current battery charging state of the electric vehicle, the telematics server 200 may calculate a path having minimum battery consumption and an electricity charging station. For example, in a case where the first driver rapidly accelerates or decelerates a number of times and has a driving pattern in which a battery charging state is maintained to be lower than a predetermined value, if there is a link having a change in a road gradient when the destination is input, battery consumption is large even though an absolute distance to the destination is short. If the battery charging state is in a low state, the telematics server 200 may provide a path, which is mainly a flat land and in which there are many electricity charging stations even though the first driver detours the path.

The telematics server 200 transmits one or more calculated candidate paths to the telematics terminal 100 (S240). When the first driver selects one candidate path (S250), the telematics terminal 100 displays a selected desired path on an electronic map and displays a drivable distance decrement expected when the first driver drives the desired path (S260).

According to an exemplary embodiment of the present disclosure, it is possible to improve accuracy and reliability of driving distance prediction of an electric vehicle based on a driving pattern of an individual driver.

A first driver may receive an optimum path in which a drivable distance decrement calculated based on his/her driving pattern is minimal. Driving patterns of multiple drivers are calculated and accumulated in the database, so that the quantity of average battery consumption for each link may be calculated. Accordingly, a position of an electricity charging station may be selected with reference to the information stored in the database.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for providing driving information of an electric vehicle, the system comprising:
    a telematics terminal configured to
        collect driver information, internal state information, and external environment information, and
        transmitting the collected driver information, internal state information, and external environment information to the outside;
    a path information server configured to transmit road information and traffic information to the outside; and
    a telematics server configured to
        accumulate information received from the telematics terminal and the path information server,
        calculate a driving pattern of a first driver based on the accumulated information,
        calculate one or more candidate paths based on the driving pattern, and
        transmit the calculated one or more candidate paths to the telematics terminal,
    wherein the system is interlocked with the telematics terminal by the telematics terminal, and
    wherein the telematics server includes:
        a server communicator configured to
            receive the driver information, the internal state information, and the external environment information, and
            transmit driving related information to the outside;
        a database configured to store the received information;
        a driving pattern calculator configured to calculate the driving pattern of the first driver based on the information accumulated in the database;
        a drivable distance calculator configured to calculate a drivable distance decrement based on the calculated driving pattern and information about a second driver accumulated in the database; and
        a path calculator configured to calculate a shortest time path, a shortest distance path, and an optimum path in which the drivable distance decrement is minimal.

2. The system of claim 1, wherein the driver information includes driver personal information, vehicle model information, driving distance information, and driving time information.

3. The system of claim 1, wherein the internal state information includes vehicle speed information, acceleration/deceleration information, battery information, motor load information, and maintenance history information, and the external environment information includes position and weather information.

4. The system of claim 1, wherein in a case where a destination is transmitted from the telematics terminal, the telematics server
    searches for the driving pattern of the first driver and information matched with the driving pattern based on the information accumulated in the database, and
    calculates the drivable distance decrement based on the driving pattern of the first driver and the information about the second driver.

5. The system of claim 4, wherein the telematics server calculates an optimum path in which the drivable distance decrement is minimal among the one or more candidate paths.

6. The system of claim 5, wherein if driving to the destination is impossible in a current battery charging state based on the information received from the telematics terminal and the searched driving pattern of the first driver and information matched with the driving pattern, the telematics server calculates a path having minimum battery consumption and an electricity charging station.

7. The system of claim 5, wherein
    the telematics server transmits a shortest time path, a shortest distance path, and the optimum path to the telematics terminal, and
    the telematics terminal
        displays a desired path selected among the shortest time path, the shortest distance path, and the optimum path, and
        guides a drivable distance decrement of the desired path.

8. The system of claim 1, wherein the telematics terminal includes:
    an information collector configured to collect the driver information, the internal state information, and the external environment information;
    a terminal communicator configured to
        transmit the collected information and a destination to the telematics server through wireless communication, and
        receive the one or more candidate paths and the drivable distance decrement;
    a display configured to display a selected desired path and the drivable distance decrement expected in a case where the first driver drives the desired path; and
    a terminal controller configured to
        transmit the collected information, and
        control the information collector, the terminal communicator, and the display to display the desired path.

9. A method of providing driving information through interworking with a telematics terminal installed in an electric vehicle by a telematics server, the method comprising:
    receiving a destination from a telematics terminal;
    searching for a driving pattern of a first driver stored in a database;
    searching for driver information, internal state information, and external environment information matched with the driving pattern stored in the database;
    calculating a drivable distance decrement based on the searched driving pattern;
    calculating one or more candidate paths including an optimum path in which the calculated drivable distance decrement is minimal; and
    transmitting the calculated one or more candidate paths to the telematics terminal,
    wherein the calculating of the one or more candidate paths including the optimum path in which the calculated drivable distance decrement is minimal, the calculating includes:
    calculating a shortest time path in which a time to arrive a destination is minimal;
    calculating a shortest distance path in which a driving distance to the destination is minimal; and
    calculating a path having minimum battery consumption to the destination and an electricity charging station.

10. The method of claim 9, wherein the driving pattern is calculated based on the driver information, the internal state information, and the external environment information accumulated in the database.

* * * * *